April 27, 1954  A. J. STREITZ  2,676,470
FLOW REGULATOR IN A REFRIGERATING SYSTEM
Filed April 24, 1950

INVENTOR.
ALQUIN J. STREITZ
BY
Charles R Werner
ATTORNEY

Patented Apr. 27, 1954

2,676,470

UNITED STATES PATENT OFFICE 2,676,470

FLOW REGULATOR IN A REFRIGERATING SYSTEM

Alquin J. Streitz, Denver, Colo.

Application April 24, 1950, Serial No. 157,749

9 Claims. (Cl. 62—127)

This invention relates in general to refrigeration apparatus and in particular to a refrigerating system employing an improved refrigerant flow regulator, simple in construction, positive and foolproof in operation, and contributing materially to the increased efficiency in the operation of the refrigerating system.

In the design of refrigerating apparatus, particularly commercial types, one of the most important goals is to attain a system which will maintain an even cooling temperature at a minimum operating cost. The system considered most efficient is the one which maintains a small differential in temperature between the coil and the refrigerated area or space at minimum compressor operation. Where a large temperature differential exists as in a dry system, the apparatus is handling a considerable quantity of refrigerant and the work load is increased.

According to dependable engineers, the best method of controlling the flow of a refrigerant has been by use of what is known as a low side float which maintains a constant liquid level in the cooling coil at a predetermined temperature thereby using the cooled refrigerant as a holding factor during the off cycle of the condensing unit. In my arrangement, the condensing unit, which includes the compressor and condenser, continues in its normal role as a means for removing the heat laden, expanded gaseous refrigerant from the cooling coil, compressing and cooling the refrigerant to a liquid for reuse. From a service standpoint I have found in actual practice that the low side float is impractical since accurate setting to obtain the desired evaporator temperature is determined only by trial and error and all the liquid refrigerant must be removed from the float chamber before adjustment to the float can be made.

Another desirable factor is to minimize the detrimental corrosive and clogging effects of moisture in the system. As little as .1% moisture can cause expansion valve or flow regulator trouble and erratic refrigeration. Some systems are specifically designed with means for cleaning the orifice in the expansion valve. Foreign particles such as solder or the like which may be present in the refrigerant line will cause failure in operation of present day systems and will result in high repair bills for cleaning out the expansion valve and bringing the refrigerant and the system back to normal.

In many refrigerating systems an accurate and precise relation must be maintained between the refrigerant in the compressor, the refrigerant in the evaporator, and the orifice or orifices in any expansion valve or flow regulator between the compressor and the evaporator.

With my invention this relationship is not so critical. Also, my invention will operate with all types of refrigerants and in all systems. It eliminates the trial and error method in trying to determine the proper size orifice needed.

The orifice in my flow regulator is so designed as to permit instantaneous, smooth and continuous expansion of the refrigerant as it is forced through the orifice into the evaporator. The orifice design facilitates sufficient back pressure to reduce velocity of refrigerant intake through the orifice resulting in substantially balanced or equilibrium condition after the system once reaches normal operating temperature, holding the temperature constant near normal for longer time periods, reducing the frequency of operation of the compressor.

The preceding problems presented are but a few of those encountered in refrigerating apparatus and systems, and with these and hereinafter disclosed problems in mind, the objects of my invention are:

First; to provide a refrigerant flow regulator so designed and constructed as to facilitate the smooth, instantaneous and continuous flow of refrigerant from the compressor to the evaporator, variations in flow being automatic and dependent on pressure and temperature conditions in the evaporator.

Second; to provide in a refrigerant flow regulator, an orifice plate with high resistance to corrosion and with a high degree of hardness, the material being preferably Monel or nickel steel or the like, whereby condensation on the orifice plate will not affect the metal, and wear by the passing refrigerant will be negligible.

Third; to provide in a refrigerant flow regulator, an orifice plate having a substantially cylindrical opening at the compressor end thereof and a chamfered opening increasing in size toward the evaporator end of the orifice plate for immediate and complete expansion and breaking up of the refrigerant upon leaving the cylindrical opening.

Fourth; to provide in a refrigerant flow regulator, an orifice plate carried by a heat transfer tube or jacket preferably formed of a material such as copper or the like having a high coefficient of heat conductivity whereby the heat of the refrigerant at room temperature will be diffused throughout the tube preventing the collection and freezing of any moisture which may be present in the system.

Fifth; to provide in a refrigerant flow regulator an orifice tube and plate easily installed and removed.

Sixth; to provide a refrigerating system which will have a small temperature differential between the cooling coil and the refrigerated space or area, a slow heat increase factor, and a long time interval between the operations of the compressor.

Seventh; to provide in a refrigerating system, a flow regulator in the refrigerant line from the compressor to the evaporator, a shutoff valve in the refrigerant line on each side of the flow regulator whereby the flow regulator can be removed without loss of refrigerant and pressure.

Other objects and advantages as well as the construction and operation of my invention will be apparent by reference to the following specification in connection with the accompanying drawing in which.

Figure 1:
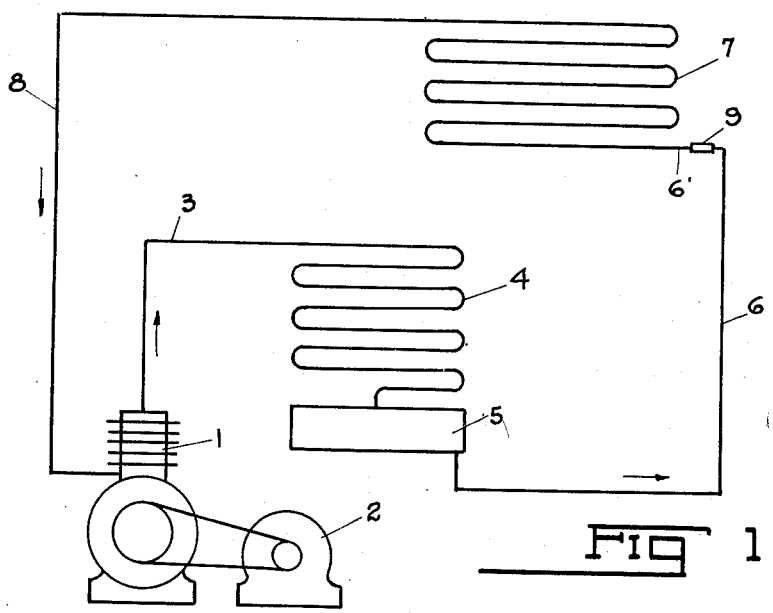
Fig. 1 is a schematic view of a refrigerating system employing my invention.
Figure 2:
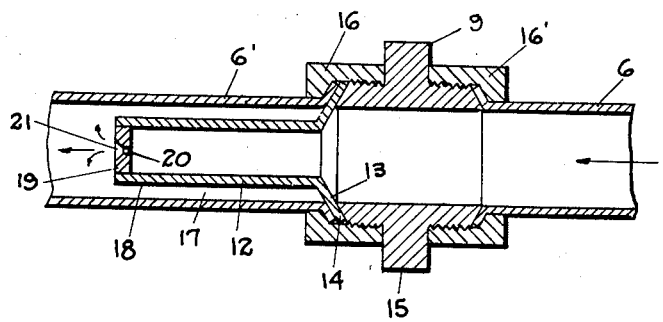
Fig. 2 is a cross sectional view through my flow regulator.
Figure 3:
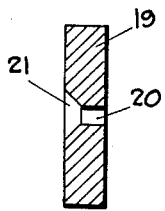
Fig. 3 is an enlarged, detail sectional view through the orifice plate used in my flow regulator.
Figure 4:
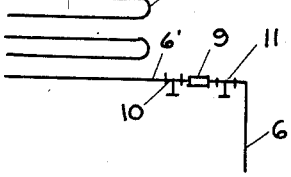
Fig. 4 illustrates the use of shut off valves in the refrigerant line.

Referring now to the drawing by numerals of reference, 1 indicates a compressor of any known construction, suitably driven by motor 2. Conduit 3 leads from the discharge end of the compressor to a condenser 4 connected to and superposed over a receiver 5.

Conduit 6 connects the receiver to one end of the evaporator 7, the other end of the evaporator being connected to the intake end of the compressor 1 through conduit 8 completing the cycle, the entire system being supplied with a suitable refrigerant, preferably the liquid type.

The flow regulator 9 comprising my invention is inserted in the line or conduit 6 and 6' adjacent the evaporator. Valves 10 and 11 may be provided one on each side of the flow regulator for isolation thereof and shutting off the refrigerant flow when removing the flow regulator for servicing or the like.

The flow regulator 9 is composed of reduced tube 12 preferably formed of a good heat conducting material such as copper or the like with flange 13 seating on chamfered end 14 of nipple 15, the nut 16 threadedly engaging the nipple and holding conduit 6' and flange 13 in intimate contact with the nipple. Another nut 16' holds the end of conduit 6 in engagement with the other side of the nipple. Tube 12 is spaced from the conduit 6' forming an annular space 17 for the purpose hereinafter specified.

The discharge end 18 of the reduced tube 12 is provided with an orifice plate 19 preferably made of a wear resistant and anticorrosive metal such as stainless steel, Monel, or the like. Plate 19 is provided with a reduced orifice 20 terminating in a flared or chamfered opening 21. Refrigerant under high pressure is forced through orifice 20 expanding as it discharges through the flared opening 21 providing for instantaneous, smooth and continuous expansion of the refrigerant.

The back pressure on the refrigerant aids in controlling its flow through the orifice and depends on the temperature condition of the system and pressure being exerted by the refrigerant in the evaporator. Without the chamfered opening 21 refrigerant will be forced a considerable distance passed the orifice before it will break up.

The high heat conductivity of the copper tube 12 will aid in diffusing the heat of the refrigerant throughout said tube whereby any moisture which may condense in the tube or at the orifice 20 will be prevented from freezing and clogging the orifice. The copper tube will not deteriorate from the moisture which may collect therein. Use of a cleaning needle for the orifice will be eliminated. Any moisture present would freeze in the evaporator coil and may stay there indefinitely without doing any harm.

The diameter of orifice 20 or the chamfer of flared opening 21 will not be critical in my invention although an approximate relationship between orifice diameter, orifice plate thickness, pressure and quantity of refrigerant should be maintained. The orifice plate 19 may be interchangeable by being removably located in the tube 12 or it may be a press fit or welded to the tube so that the entire tube 12 with the appropriate orifice plate insert may be replaced.

As seen in the drawing, the flow regulator 9 is installed in the conduit 6' at a point lower than the bottom of the evaporator coil and the return conduit 8 leads from the top of the evaporator whereby the evaporator remains flooded with refrigerant at all times.

From the foregoing it will be apparent that I have provided a simple but effective flow regulator employing a reduced conductor tube with an orifice for breaking up the refrigerant, for eliminating clogging by freezing of condensed moisture, said flow regulator being so positioned in the system whereby a continuous flooded condition exits.

It is obvious that details may be changed in form, proportion and construction without departing from the spirit of my invention and I reserve all rights to such changes as come within the scope of these specifications and the claims which follow.

What I claim as new and desire to secure by Letters Patent is:

1. A flow regulator in a refrigerating system including a compressor, a condenser, a receiver and an evaporator all connected in closed cycle relation by conduit, said flow regulator being in the conduit between the evaporator and the receiver and including an orifice insert member, said last-named member comprising an elongated tube with a cross sectional area less than that of the conduit, and an orifice plate in the tube.

2. The structure as specified in claim 1, said tube being formed of a metal having a high coefficient of heat conductivity.

3. The structure as specified in claim 1, said orifice plate being formed of a metal having a high factor of non-corrosion and anti-wear characteristics.

4. A flow regulator in a refrigerating system including a compressor, a condenser, a receiver and an evaporator all connected in closed cycle relation by conduit, said flow regulator being in the conduit between the evaporator and the receiver and including a removable orifice insert member, said last-named member comprising an elongated tube with a reduced cross sectional area less than that of the conduit, and an orifice plate at the evaporator end of the tube.

5. A flow regulator in a refrigerating system including a compressor, a condenser, a receiver and an evaporator, all connected in closed cycle relation by conduit, said flow regulator being in the conduit between the evaporator and the receiver and including a removable orifice insert member, said last-named member comprising an elongated tube with a reduced cross-sectional area less than that of the conduit, and a removable orifice plate at the evaporator end of the tube.

6. A flow regulator in a refrigerating system including a compressor, a condenser, a receiver and an evaporator all connected by conduit in closed cycle relation, and said flow regulator being in the conduit between the evaporator and the receiver and comprising an elongated orifice insert member mountable in the conduit and spaced from the walls thereof forming a chamber about the insert member, and an orifice plate in the tube.

7. A flow regulator in a refrigerating system including a compressor, a condenser, a receiver and an evaporator, all connected by conduit in closed cycle relation, and said flow regulator being in the system between the evaporator and the receiver and comprising an elongated orifice insert member of reduced cross sectional area, a flange at one end of the insert member receivable by the conduit, a chamber being formed between the conduit and the insert member, the flange forming one closed end for the chamber, the other end of the chamber being open, and an orifice plate in the insert member.

8. The structure as specified in claim 7, said orifice plate being at the end of the insert member opposite the flange.

9. The structure as specified in claim 7, said orifice plate being at the end of the insert member adjacent the open end of the chamber.

References Cited in the file of this patent

UNITED STATES PATENTS

| Number | Name | Date |
|---|---|---|
| 1,687,286 | Freer | Oct. 9, 1928 |
| 1,704,177 | Davenport | Mar. 5, 1929 |
| 2,164,761 | Ashley | July 4, 1939 |
| 2,214,698 | Kelly | Sept. 10, 1940 |
| 2,430,692 | Touberg | Nov. 11, 1947 |

FOREIGN PATENTS

| Number | Country | Date |
|---|---|---|
| 255,677 | Great Britain | July 29, 1926 |